United States Patent
Takeuchi et al.

(10) Patent No.: US 6,211,736 B1
(45) Date of Patent: Apr. 3, 2001

(54) SIGNAL AMPLIFYING CIRCUIT FOR MAGNETORESISTIVE ELEMENT

(75) Inventors: Toru Takeuchi; Takehiko Umeyama, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/461,328

(22) Filed: Dec. 15, 1999

(30) Foreign Application Priority Data

Jun. 30, 1999 (JP) .................................................. 11-185735

(51) Int. Cl.[7] .................................. H03F 3/45; G11B 5/02
(52) U.S. Cl. ................................................ 330/252; 360/67
(58) Field of Search ..................................... 330/252, 257; 360/68, 67

(56) References Cited

U.S. PATENT DOCUMENTS

| | | | |
|---|---|---|---|
| 5,452,148 | * 9/1995 | Kawai et al. | 360/67 |
| 5,757,566 | 5/1998 | Ngo et al. | 360/67 |
| 5,831,784 | * 11/1998 | Barnett et al. | 330/252 |
| 6,057,972 | * 5/2000 | Castelluci | 360/67 |
| 6,084,469 | * 7/2000 | Lorenz | 330/252 |
| 6,114,905 | * 9/2000 | Hashimoto et al. | 330/252 |
| 6,154,333 | * 11/2000 | Narusawa et al. | 330/252 |

FOREIGN PATENT DOCUMENTS

| | | |
|---|---|---|
| 10198909 | 7/1998 | (JP) . |
| 1131302 | 2/1999 | (JP) . |

\* cited by examiner

*Primary Examiner*—Robert Pascal
*Assistant Examiner*—Khanh Van Nguyen
(74) *Attorney, Agent, or Firm*—Leydig, Voit & Mayer, Ltd.

(57) ABSTRACT

A signal amplifying circuit has a differential amplifying circuit, a capacitor and a voltage follower. This circuit takes as input signal the signals outputted from the two terminals of an MR element to which a bias electric current is supplied, and amplifies and outputs the difference in input signals from output terminals. One input terminal of this circuit is connected directly with one of the terminals of the MR element. A capacitor connects the other input terminal of this circuit with the another terminal of the MR element. The two input terminals of this circuit are connected respectively with a non-inverting input terminal and an inverting input terminal of the voltage follower. The voltage follower provides an output to an input terminal of this circuit via a resistance.

8 Claims, 10 Drawing Sheets

SIGNAL AMPLIFYING CIRCUIT FOR MAGNETORESISTIVE ELEMENT

FIELD OF THE INVENTION

The present invention relates to a signal amplifying circuit for a magnetoresistive element, as an element for a head of a magnetic recording medium such as a hard disk and a floppy disk, used in a hard disk drive (HDD), a floppy disk drive (FDD) or the like. More specifically this invention relates to a signal amplifying circuit for a magnetoresistive element capable of being integrated on one semiconductor chip.

BACKGROUND OF THE INVENTION

Recently, as an element for a head of a magnetic recording medium used in a hard disk drive, floppy disk drive or the like, a magnetoresistive element (hereinafter, referred to as "MR (magnetoresistive) element") has been used widely. In the head using the MR element (hereinafter, referred to as "MR head"), since a reproduction output is stronger than that of a conventional head using a thin film element, the surface recording density of the magnetic recording medium can be improved greatly. Here, in the following description, the MR element means an element which shows a magnetoresistive effect where resistance changes due to application of an external magnetic field. The MR element includes a GMR (giant magnetoresistive) element or a TMR (tunneling magnetoresistive) element, for example.

FIG. 9 is a circuit diagram showing a conventional signal amplifying circuit of the MR element. The signal amplifying circuit shown in FIG. 9 functions as an output detection circuit of the MR element, namely, a read amplifying circuit. In FIG. 9, both terminals T1 and T2 of the MR element MR are connected respectively with input terminals in1 and in2 of a differential amplifying circuit DA1. The terminal T1 of the MR element MR is connected with a resistance R11 in series, and the terminal T2 is connected with an electric current source CS1 again in series. The constant electric current source CS1 discharges a bias electric current Ib from a power source line Vcc at high potential to a power source line Vee at low potential. Therefore, the bias electric current Ib flows in the MR element MR, and thus the MR element MR generates an electric potential difference which is in proportion to a difference in resistance at the terminals T1 and T2.

The differential amplifying circuit DA1 has transistors TR1 and TR2 which compose a differential pair. The collectors of these transistors TR1 and TR2 are connected with collector resistances RC1 and RC2 having a same resistance value Rc. These resistances RC1 and RC2 are connected with the power source line Vcc. Moreover, emitters of the transistors TR1 and TR2 are connected with each other through a capacitor C1, and the emitters of the transistors TR1 and TR2 are connected respectively with electric current sources CS2 and CS2' in series. The electric current sources CS2 and CS2' are connected with the power source line Vee. Bases of the transistors TR1 and TR2 function as input terminals in1 and in2. Collector terminals of the transistors TR1 and TR2 are also connected respectively with output terminals out1 and out2. The emitters of the transistors TR1 and TR2 composing the differential pair are connected with each other by the capacitor C1 in order to cancel a DC potential difference between the terminals T1 and T2 of the MR element MR to be inputted into the differential amplifying circuit DA1.

In this signal amplifying circuit, the resistance value of the MR element MR in which the bias electric current Ib flows changes according to a magnetic signal from the outside, and thus a potential difference between the terminals T1 and T2 of the MR element MR changes Only an AC portion of the changed potential difference is amplified by the differential amplifying circuit DA1 so as to be outputted as a potential difference between the output terminals out1 and out2, namely, an output voltage.

Incidentally, since an input signal from the MR element MR is a weak input signal of less than 1 mvpp, the differential amplifying circuit DA1 should physically be provided in a vicinity of the MR element MR, and hence it is usual to form an integrated circuit.

However, a capacitance of the capacitor C1 which is realized on one semiconductor chip is maximum about several nF.

Since a cut-off frequency f of a low frequency becomes high, i.e., several tens MHz in such a capacitor C1 having such a small capacitance, a capacitance of an external capacitor should be used. As a result, integration of the signal amplifying circuit of the MR element is hindered, and thus promotion of miniaturization and light weight is prevented.

The cut-off frequency f will be described below concretely with reference to FIG. 10. When a base electric current is ignored, a gain Av of the differential amplifying circuit DA1 shown in FIG. 10 becomes:

$$Av = Rc/re = Rc \cdot Ie/V_T.$$

Here, "re" is an emitter resistance of the transistors TR1 and TR2, and "$V_T$" is thermal voltage defined as follows:

$$V_T = kT/q \sim 26 \text{ mV at 300 K}.$$

where, q=electric charge, k=Boltzman's constant,

T=temperature (in K).

In FIG. 9, since the capacitor C1 is connected with the emitter resistances of the transistors TR1 and TR2 in series, when electric currents which flow in the constant electric current sources CS2 and CS2' are Ie as shown in FIG. 9, $$Av = Rc/(re + 1/2j\omega C) = Rc/(V_T/Ie + 1/2j\omega C).$$

Here, "C" is a capacitance of the capacitor C1. Accordingly, the cut-off frequency f becomes:

$$f = Ie/(4\pi V_T \cdot C).$$

When Ie=10 mA and C=5 nF, the cut-off frequency f becomes:

$$f = 10 \text{ mA}/(4 \times 3.14 \times 26 \text{ mV} \times 5 \text{ nF}) = 6.1 \text{ MHz},$$

and thus it can be understood that the cut-off frequency f is high.

SUMMARY OF THE INVENTION

The present invention has been achieved with such points in view. It therefore is an object of the present invention to provide a signal amplifying circuit for a magnetoresistive element which can be integrated on one semiconductor chip.

In the signal amplifying circuit according to the present invention, a first input terminal of a differential amplifying circuit is directly connected with a first terminal of a magnetoresistive element by a connection line, and a second input terminal of the differential amplifying circuit is connected with a second terminal of the magnetoresistive element by a first capacitor. An AC component corresponding to a change in the resistance, which is generated at both the terminals of the magnetoresistive element by the change of the external magnetic field, is outputted differentially by the differential amplifying circuit. Further, a DC offset, which is generated between the first input terminal and the second input terminal of the differential amplifying circuit, is canceled by a DC offset cancel circuit, and a cut-off frequency of a high-pass filter, which is formed by the first capacitor and the impedance of the DC offset cancel circuit, is determined.

Further, the DC offset cancel circuit is composed by a voltage follower. The first input terminal and the second input terminal of the differential amplifying circuit are connected with a first input terminal and a second input terminal of the voltage follower, and an output is obtained at the second input terminal of the differential amplifying circuit via a first resistance. The DC offset generated between the first input terminal and the second input terminal of the differential amplifying circuit is canceled by the voltage follower, and DC input impedance to the second input terminal of the differential amplifying circuit is set to a desired value by using the first resistance. A cut-off frequency of a high-pass filter, formed by the first capacitor and synthetic impedance of the output impedance of the voltage follower and the first resistance, is determined.

Further, when the input signals from the first terminal and second terminal of the magnetoresistive element are inputted into the first input terminal and the second input terminal of the differential amplifying circuit, the input signals are inputted via a first emitter follower and a second emitter follower so that an output impedance from the magnetoresistive element is lowered, and thus an unbalanced state of input capacitance to the differential amplifying circuit due to parasitic capacitance of the first capacitor is prevented. Moreover, the high-pass filter is prevented from being formed by the magnetoresistive element and the first capacitor.

Further, a second resistance and a third resistance having same resistance value are connected with both the terminals of the magnetoresistive element. A second capacitor shorts the second resistance in an alternating way, the magnetoresistive element and the third resistance which are connected in series, and the input impedance of the differential amplifying circuit is paired so as to be equal.

Further, third and fourth transistors are provided on a stage previous to a differential pair of the differential amplifying circuit, and bases of the third and fourth transistors are cascade connected with each other with constant potential. Emitters of the third and fourth transistors are connected respectively with collectors of the differential pair, and outputs from collector terminals of the third and fourth transistors are outputted as differential output of the differential amplifying circuit so that input capacitance of the differential amplifying circuit becomes small.

Further, a bias electric current which flows in the magnetoresistive element is limited so that an electric potential of the magnetoresistive element such as a mid-point potential is always maintained in a reference potential. For this reason, a comparison circuit controls feedback to a current limiting circuit.

Further, a plurality of the magnetoresistive elements are provided, and a plurality of circuits, where input signals generated at both the terminals of the magnetoresistive elements are inputted into one differential amplifying circuit, are provided in parallel. Open/close operation of switches directly connected with the magnetoresistive elements is controlled so that current flow of the magnetoresistive elements is switched so that only input signal from a desired one magnetoresistive element is amplified differentially.

Further, OTA, where an oscillation margin can be obtained and a noise characteristic is satisfactory, is used as the voltage follower which is the DC offset cancel circuit.

Other objects and features of this invention will become apparent from the following description with reference to the accompanying drawings.

DESCRIPTION OF THE PREFERRED EMBODIMENTS

Preferred embodiments of a signal amplifying circuit for a magnetoresistive element according to the present invention will be described below with reference to the drawings.

Figure 1:
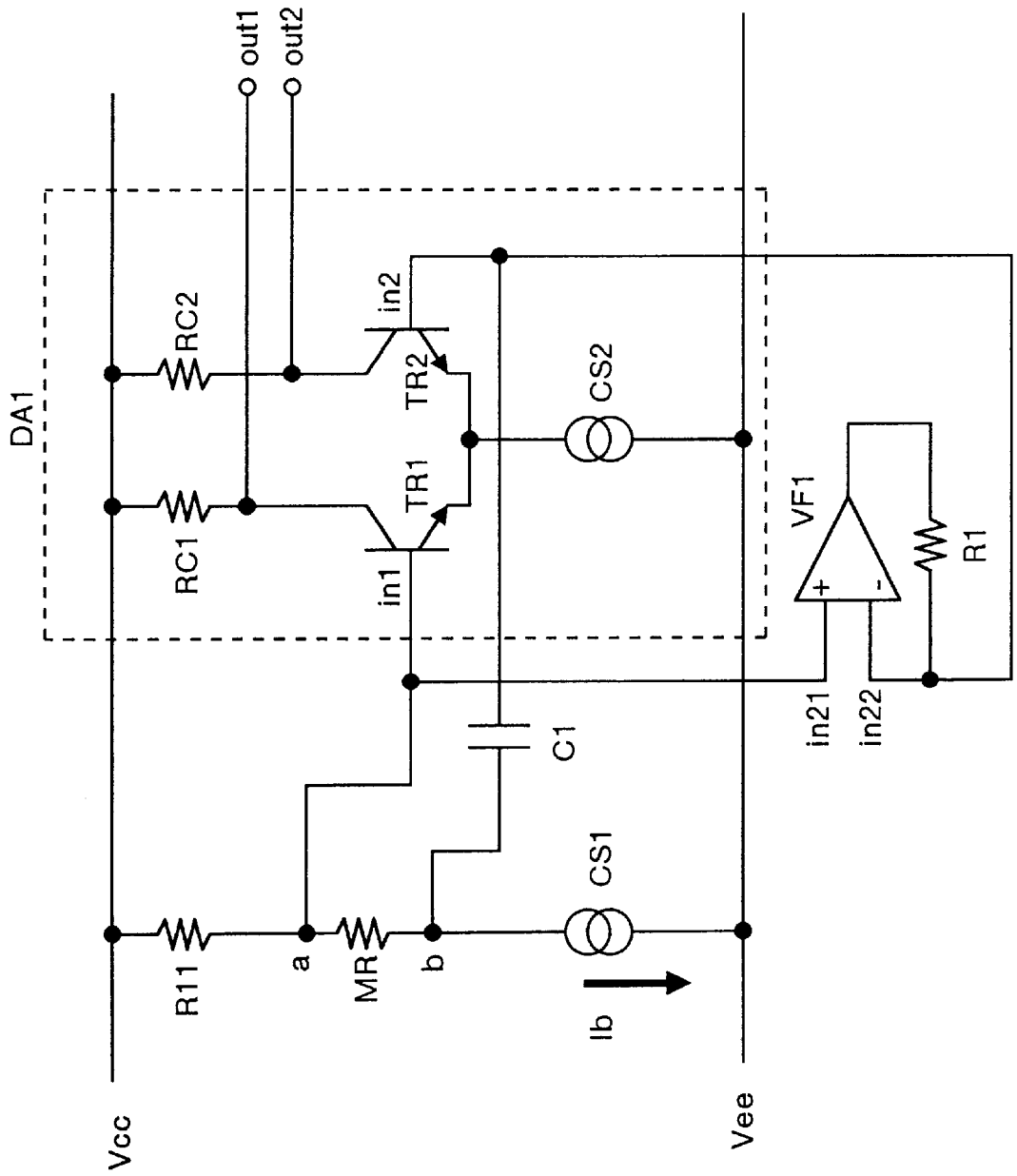
FIG. 1 is a circuit diagram showing a configuration of a signal amplifying circuit for a magnetoresistive element according to a first embodiment of the present invention.

To begin with, a first embodiment of the present invention will be described below. FIG. 1 is a circuit diagram showing a configuration of a signal amplifying circuit for a magnetoresistive element according to the first embodiment of the present invention. The signal amplifying circuit shown in FIG. 1 functions as an output detection circuit of a magnetoresistive element (MR element) MR, namely, a read amplifying circuit. In FIG. 1, a terminal a on an upper-stream side of both terminals a and b of the MR element MR is directly connected with an input terminal in1 of a differential amplifying circuit DA1, and the other terminal b is connected with an input terminal in2 of the differential amplifying circuit DA1 through a capacitor C1. Moreover, the terminal a of the MR element MR is connected with a resistance R11 in series, and the terminal b is connected with an electric current source CS1 in series. The constant electric current source CS1 discharges a bias electric current Ib to a power source line Vee at a low potential from a power source line Vcc at a high potential. Therefore, the bias electric current Ib flows in the MR element MR, and thus the MR element MR generates a potential difference which is in proportion to a difference in the resistance at the terminals a and b.

The differential amplifying circuit DA1 has transistors TR1 and TR2 composing a differential pair. The collectors of these transistors TR1 and TR2 are connected respectively with collector resistances RC1 and RC2 having a same resistance Rc. These resistances RC1 and RC2 are connected with the power source line Vcc. Moreover, emitters of the transistors TR1 and TR2 are connected directly with each other, and the node between them is connected with a constant electric current source CS2 so as to be connected with the power source line Vee via this constant electric current source CS2. Bases of the transistors TR1 and TR2 function as the input terminals in1 and in2, and their collector terminals are connected with output terminals out1 and out2.

Since the capacitor C1 cuts a DC (direct current) component so as to transmit only an AC (alternating current) component, a DC potential difference generated between the terminals a and b of the MR element MR is cut so that only an AC component is inputted into the differential amplifying circuit DA1. The amplified signal is differentially outputted from the output terminals out1 and out2.

Meanwhile, a voltage follower VF1 is provided so as to cancel a DC offset generated between the input terminal in1 and in2 of the differential amplifying circuit DA1. The voltage follower VF1 is realized by a differential amplifying circuit such as an operation amplifying circuit. A non-inversion input terminal in21 of the voltage follower VF1 is connected with the input terminal in1, and an inversion input terminal in22 of the voltage follower VF1 is connected with the input terminal in2. An output of the voltage follower VF1 is connected with the inversion input terminal in22 via a resistance R1. The resistance R1 is used for setting an input impedance of the transistor TR2 to a desired value.

Here, a capacitance of the capacitor C1 is determined by a cut-off frequency of a high-pass filter, which is formed by a series resistance RR (=R0+R1) of an output impedance RO of the voltage follower VF1 and the resistance R1 and by the capacitor C1. Therefore, the capacitance of the capacitor C1 has a value which can be realized within a value of a capacitance formed on a semiconductor chip, and as a result, the whole signal amplifying circuit can be mounted onto one semiconductor chip IC.

According to the first embodiment, the voltage follower VF1 cancels the DC offset generated between the terminals a and b of the MR element MR, and the capacitance of the capacitor C1 is determined by the cut-off frequency of the high-pass filter, which is formed by the series resistance value RR of the output impedance R0 of the voltage follower VF1 and the resistance R1 and by the capacitor C1. Therefore, a capacitor having a small capacitance can be used as the capacitor C1, so that the capacitor C1 can be mounted onto the same semiconductor chip IC, and the need to provide the capacitor C1 as an external element with respect to the semiconductor chip is eliminated. As a result, the whole signal amplifying circuit can be realized as a circuit on a single semiconductor chip IC.

Second embodiment of the present invention will be described below. In the second embodiment, as a concrete differential amplifying circuit of the voltage follower VF1 in the first embodiment, OTA (operational transconductance amplifying circuit) is used.

Figure 2:
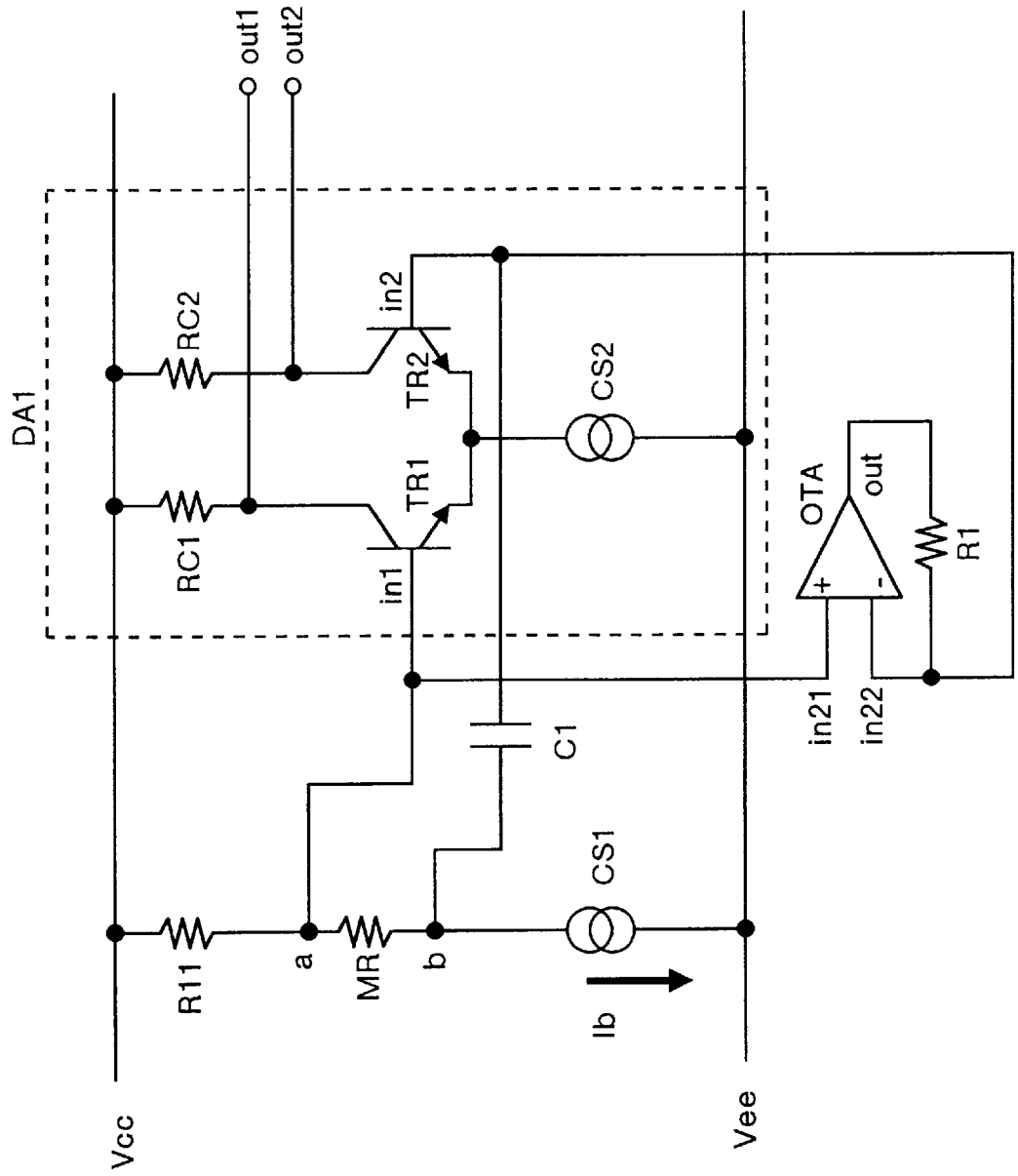
FIG. 2 is a circuit diagram showing a configuration of the signal amplifying circuit for a magnetoresistive element according to a second embodiment of the present invention.

FIG. 2 is a circuit diagram showing a configuration of the signal amplifying circuit for a magnetoresistive element according to the second embodiment of the present invention. In FIG. 2, the OTA is used as the differential amplifying circuit corresponding to the voltage follower VF1 shown in FIG. 1. Since oscillation margin is large and a noise characteristic is excellent in the OTA, its performance can be improved.

Figure 3:
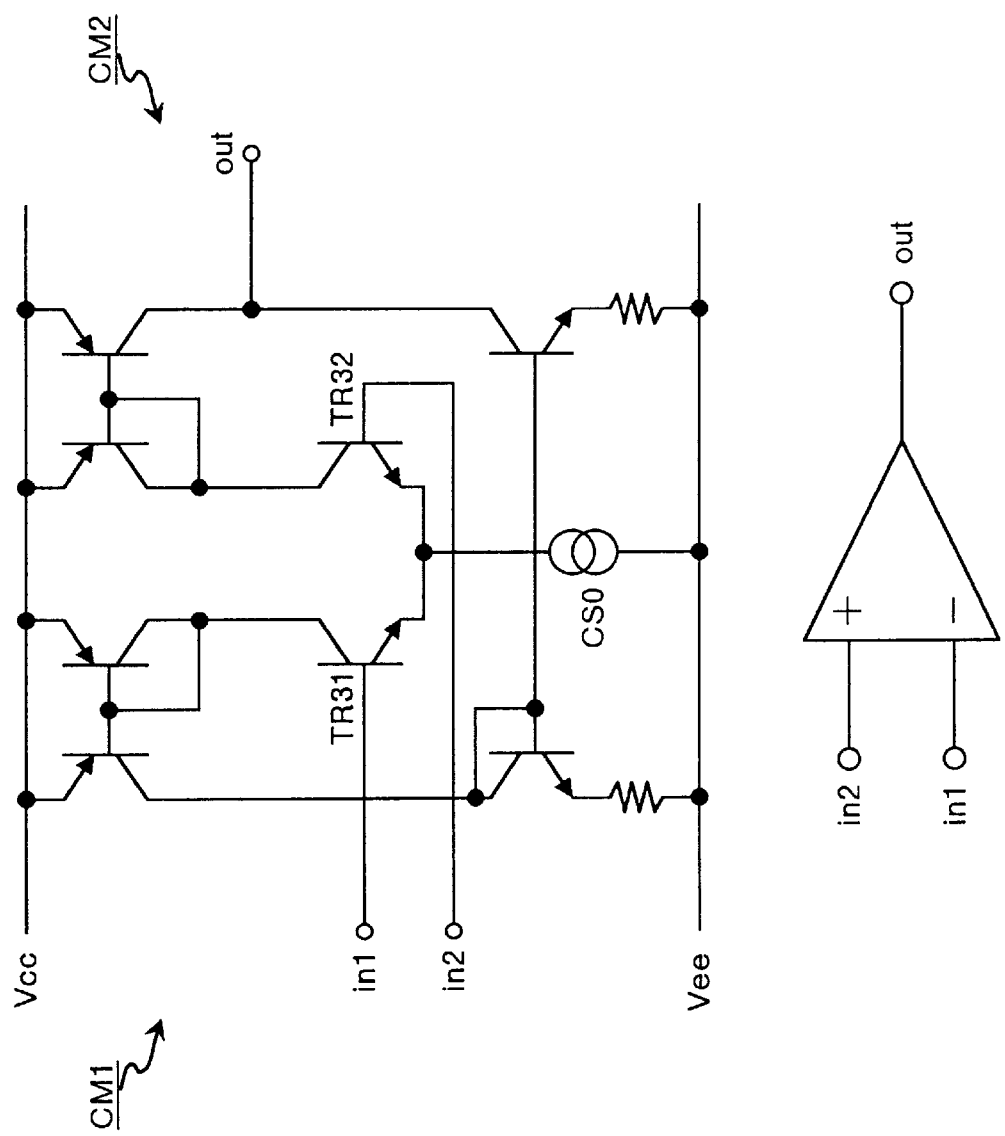
FIG. 3 is a circuit diagram showing a detailed structure of an operational transconductance amplifier according to the second embodiment of the present invention.

FIG. 3 is a circuit diagram showing one example of the OTA to be used in the second embodiment of the present invention. In FIG. 3, an electric current flows in current mirror circuits CM1 and CM2 by an electric current source CS0 from the power source line Vcc with high potential so that the power source line Vcc is connected with collector terminals of transistors TR31 and TR32 composing a differential pair via the current mirror circuits CM1 and CM2. Bases of the transistors TR31 and TR32 are connected respectively with the input terminals in1 and in2 of the transistors TR1 and TR2. An output terminal of the current mirror circuit CM2 which is not connected with the collector terminal of the transistor TR32 becomes an output terminal out of the OTA.

According to the second embodiment, the same effect as that in the first embodiment is obtained. Further, since the OTA is used as the voltage follower VF1, a signal amplifying circuit in which the oscillation margin and noise characteristic are further improved can be obtained.

Third embodiment of the present invention will be described below. In the third embodiment, in addition to the structure of the signal amplifying circuit in the first embodiment, input signals from the terminals a and b of the MR element MR are inputted into the differential amplifying circuit DA1 via an emitter follower. Moreover, an output impedance from the MR element MR is lowered so that a high-pass filter is prevented from being formed by the MR element MR and the capacitor C1.

Figure 4:
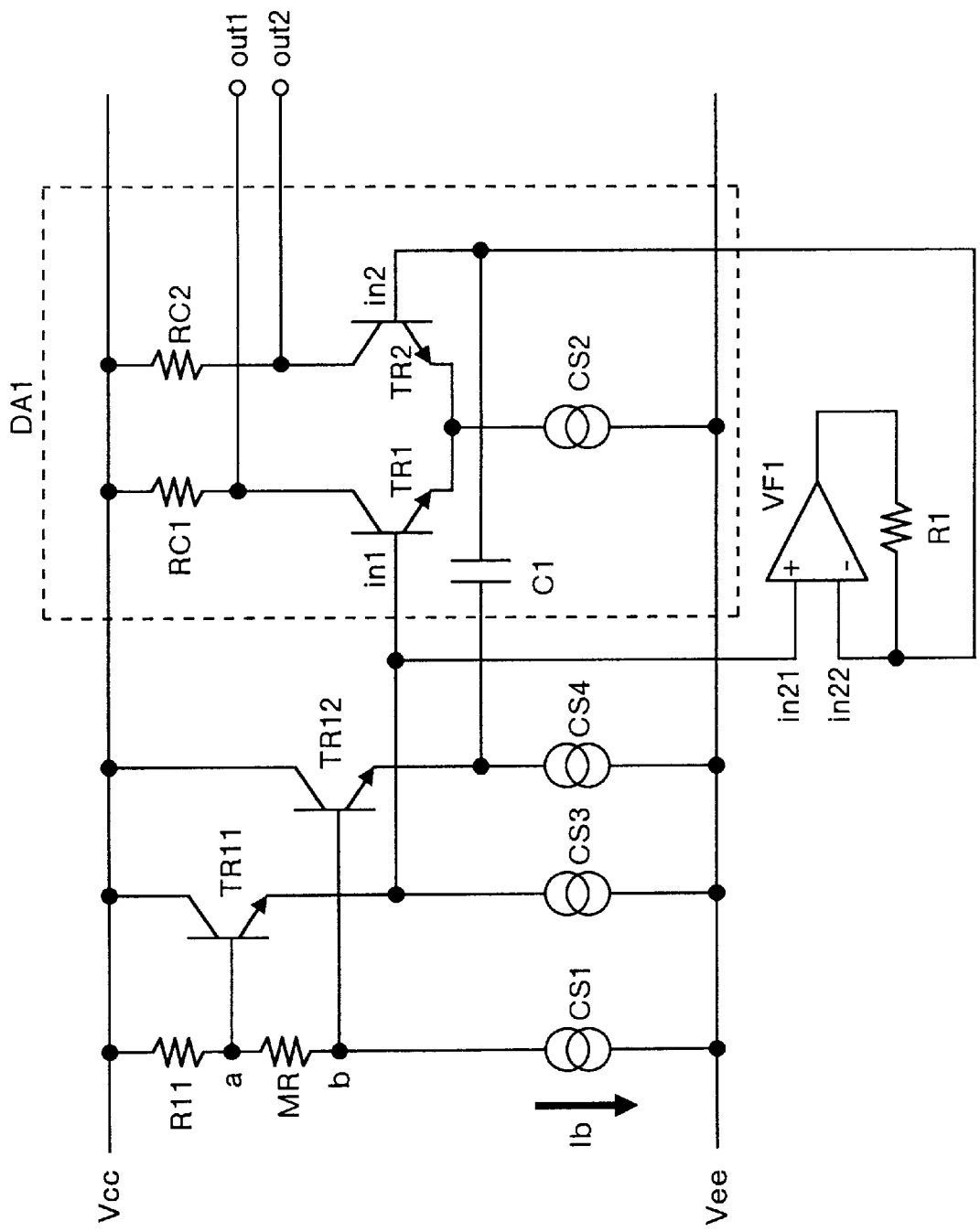
FIG. 4 is a circuit diagram showing a configuration of the signal amplifying circuit for a magnetoresistive element according to a third embodiment of the present invention.

FIG. 4 is a circuit diagram showing a configuration of the signal amplifying circuit for a magnetoresistive element according to the third embodiment of the present invention. In the signal amplifying circuit shown in FIG. 4, transistors TR11 and TR12 are newly provided. The other configuration is the same as that in the first embodiment. In FIG. 4, a base of the transistor TR11 is connected with the terminal a of the MR element MR, and its collector is connected with the power source line Vcc, and its emitter is connected with the input terminal in1. An electric current source CS3 is connected between the emitter of the transistor TR11 and the power source line Vee. Moreover, a base of the transistor TR12 is connected with the terminal b of the MR element MR, and its collector is connected with the power source line Vcc, and its emitter is connected with the input terminal in2 via the capacitor C1. An electric current source CS4 is connected between the emitter of the transistor TR12 and the power source line Vee.

Concretely, the transistors TR11 and TR12 function as emitter followers, and prevent an unbalanced state such that input capacitance of the differential amplifying circuit DA1 becomes larger due to parasitic capacitance of the capacitor C1. Further, the transistors TR11 and TR12 reduce output impedance from the MR element MR, and prevent a high-pass filter from being formed by the MR element MR and the capacitor C1. This is because if a high-pass filter is formed, an AC output of a low frequency cannot be detected.

According to the third embodiment, since the output impedance from the MR element MR is reduced by providing the emitter follower between the terminals a and b of the MR element MR, the unbalanced state of the input capacitance of the differential amplifying circuit DA1 due to the parasitic capacitance of the capacitor C1 is prevented, and the high-pass filter is prevented from being formed by the MR element MR and the capacitor C1. As a result, an AC voltage difference generated by the MR element MR can be detected securely and accurately.

Fourth embodiment of the present invention will be described below. In the fourth embodiment, in addition to the third embodiment, the input impedance to the input terminal in1 and the impedance to the input terminal in2 of the differential amplifying circuit DA1 become equal to each other.

Figure 5:
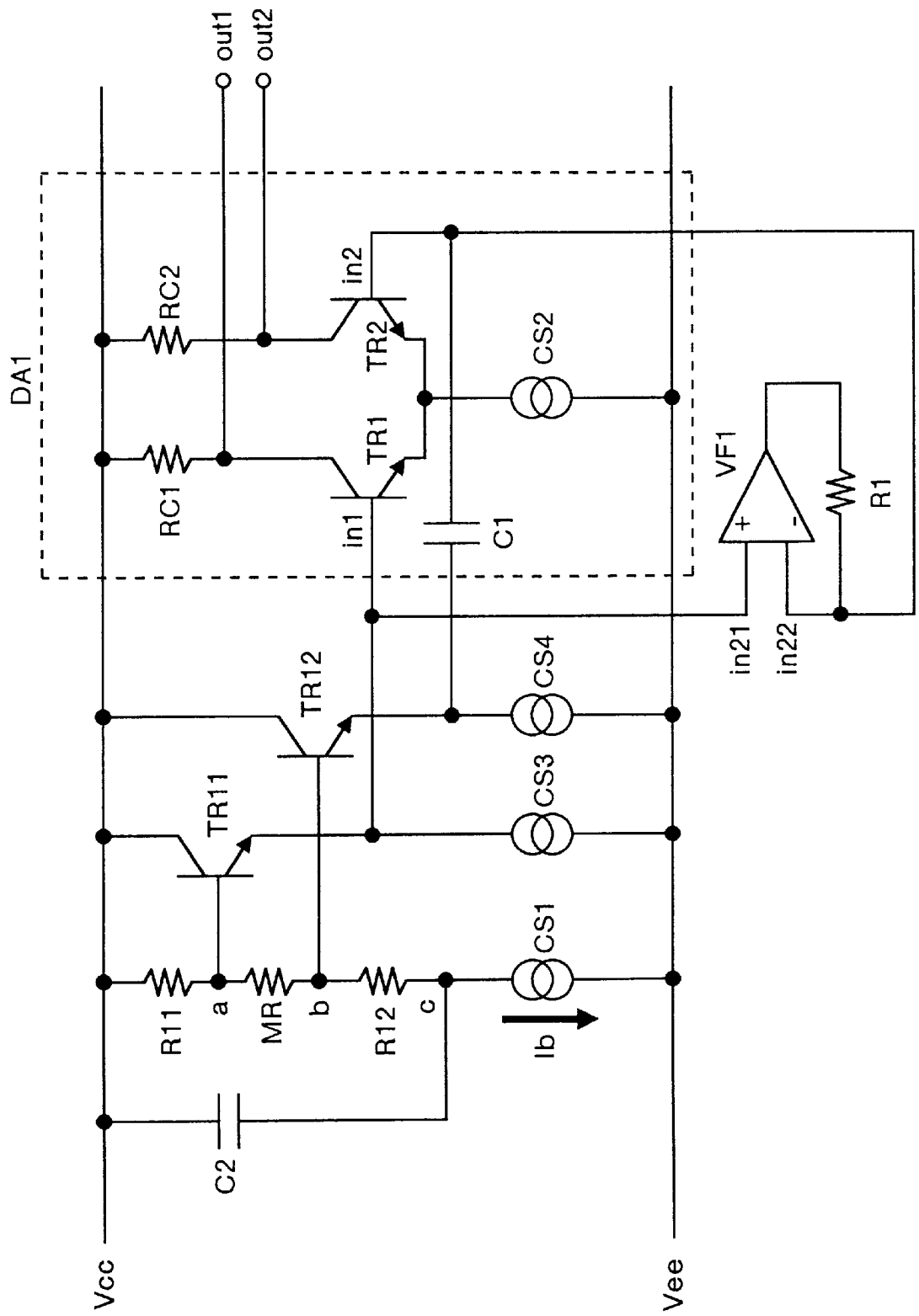
FIG. 5 is a circuit diagram showing a configuration of the signal amplifying circuit for a magnetoresistive element according to a fourth embodiment of the present invention.

FIG. 5 is a circuit diagram showing a configuration of the signal amplifying circuit for a magnetoresistive element according to the fourth embodiment of the present invention. In the fourth embodiment shown in FIG. 5, a resistance R12 having a resistance value same as that of the resistance R11 is connected between the terminal b of the MR element MR and the electric current source CS1, and a capacitor C2 is additionally connected between a node c of the resistance R12 and the electric current source CS1 and the power source line Vcc. The other configuration is the same as that in the third embodiment.

In FIG. 5, the capacitor C2 shorts between the power source line Vcc and the node c in an alternating way so that the input impedance of the input terminal in1 is made to become equal with the input impedance of the input terminal in2 of the differential amplifying circuit DA1 by the resistances R11 and R12 having the same resistance. The input impedance to the differential amplifying circuit DA1 is paired so that CMRR (Common Mode Rejection Ratio) can be improved.

According to the fourth embodiment, the effect which is the same as that in the third embodiment is obtained. Further, the input impedance to the differential amplifying circuit DA1 is paired, so that the CMRR is improved.

Fifth embodiment of the present invention will be described below. In the fifth embodiment, in addition to the configuration in the fourth embodiment, the collector of the differential amplifying circuit DA1 is connected with emitters of two transistors which are cascade connected with each other, and outputs from collector terminals of the two transistors are taken out as a differential output.

Figure 6:
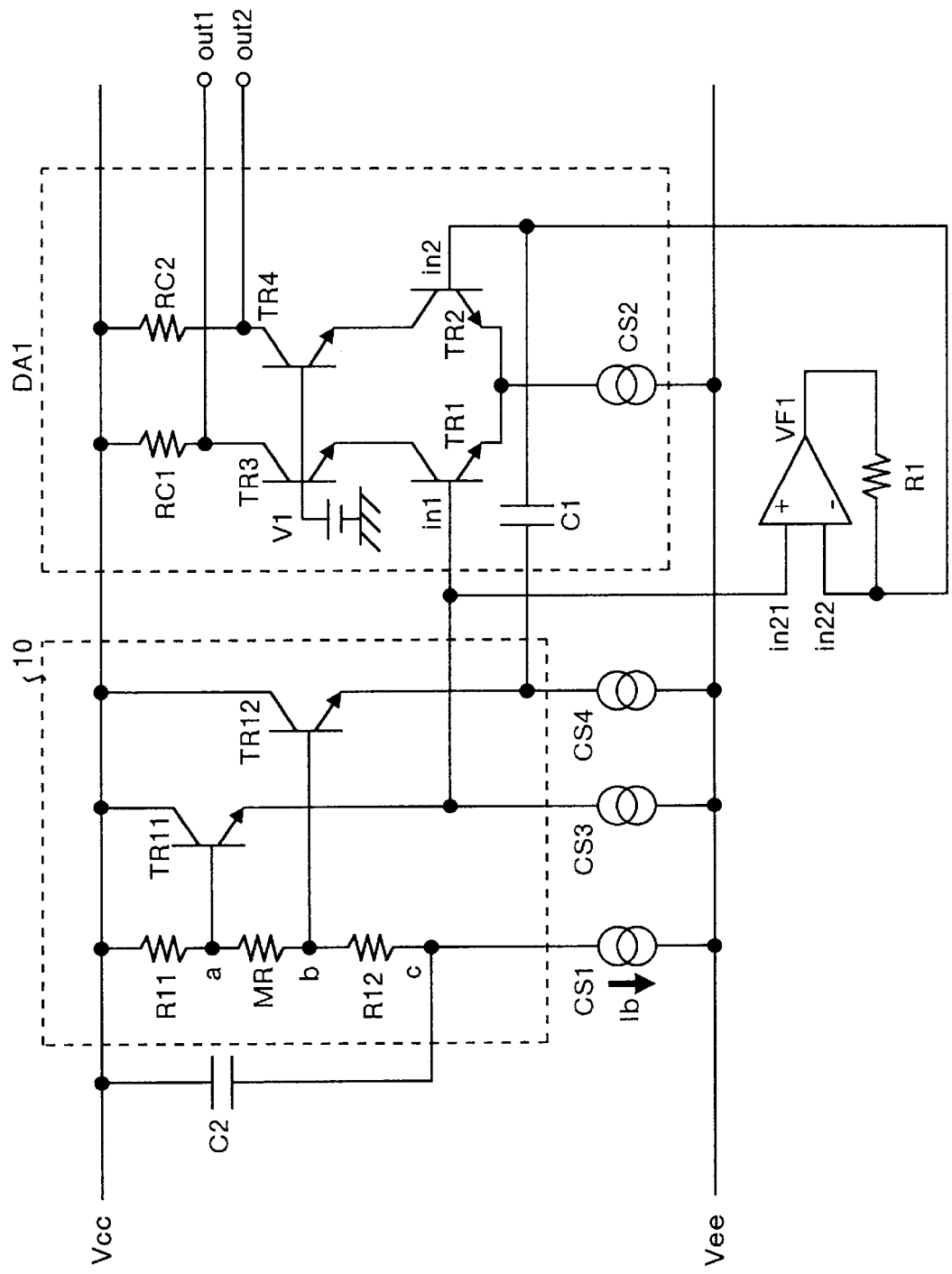
FIG. 6 is a circuit diagram showing a configuration of the signal amplifying circuit for a magnetoresistive element according to a fifth embodiment of the present invention.

FIG. 6 is a circuit diagram showing a configuration of the signal amplifying circuit for a magnetoresistive element according to the fifth embodiment of the present invention. In the fifth embodiment shown in FIG. 6, transistors TR3 and TR4 whose bases are cascade connected with a constant potential V1 are newly provided, and the collector terminals of the transistors TR1 and TR2 as a differential pair composing the differential amplifying circuit DA1 are connected respectively with emitter terminals of the transistors TR3 and TR4. Moreover, a node between the resistance RC1 and a collector terminal of the transistor TR3 is made as an output terminal out1, and a node between the resistance RC2 and a collector terminal of the transistor TR4 is made as output terminal out2. A differential output is taken out from the output terminals out1 and out2. The other configuration is the same as that in the fourth embodiment shown in FIG. 5.

According to the fifth embodiment, the transistors TR3 and TR4 which are cascade connected with each other are provided, and a differential output is taken out from the collector terminals of the transistors TR3 and TR4. As a result, input capacitance of the differential amplifying circuit DA1 can be smaller, and thus a high-frequency characteristic can be improved.

Sixth embodiment of the present invention will be described below. In the sixth embodiment, in addition to the structure in the fifth embodiment, a mid-point voltage of the MR element MR is maintained in a predetermined reference voltage so that the MR element MR is protected.

Figure 7:
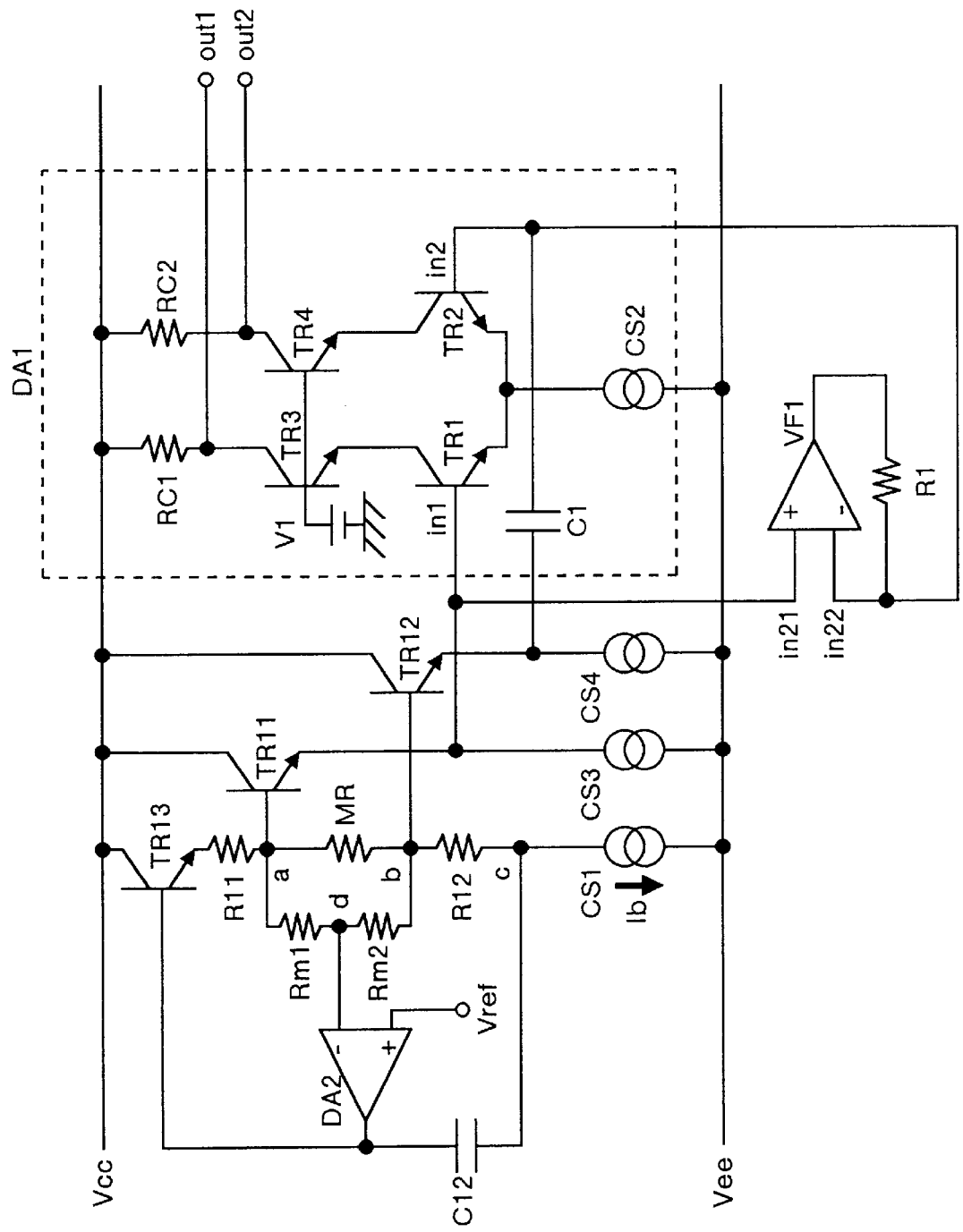
FIG. 7 is a circuit diagram showing a configuration of the signal amplifying circuit for a magnetoresistive element according to a sixth embodiment of the present invention.

FIG. 7 is a circuit diagram showing a configuration of the signal amplifying circuit for a magnetoresistive element according to the sixth embodiment of the present invention. In the sixth embodiment shown in FIG. 7, resistances Rm1 and Rm2, which are connected in series and have a same resistance, are connected with the terminals a and b of the MR element MR in parallel. Further, a transistor TR13 is provided between the resistance R11 and the power source line Vcc, and a collector terminal of the transistor TR13 is connected with the power source line Vcc, and its emitter terminal is connected with the resistance R11. Further, a differential amplifying circuit DA2, where an electric potential of a node d between the resistances Rm1 and Rm2 is an inversion input terminal, and a predetermined reference potential Vref is a non-inversion input terminal, is provided. Moreover, an output terminal of the differential amplifying circuit DA2 is connected with a base of the transistor TR13, and a node c between the resistance R12 and the electric current source CS1 is connected with an output terminal of the differential amplifying circuit DA2 through a capacitor C12. The other configuration is the same as that in the fifth embodiment.

In the signal amplifying circuit shown in FIG. 7, an output according to a potential difference between the potential at the node d and the reference potential Vref is outputted from the output terminal of the differential amplifying circuit DA2, and is fed back to the transistor TR13. Accordingly, the mid-point potential of the MR element MR becomes equal with the reference potential Vref. As a result, the mid-point potential of the MR element MR is always maintained in the reference potential Vref so that the MR element MR is protected.

According to the sixth embodiment, since feedback is controlled so that the mid-point potential of the MR element MR is always maintained in the reference potential Vref, the mid-point potential of the MR element MR is maintained in the reference potential Vref so that the MR element MR is protected.

Seventh embodiment of the present invention will be described below. In the seventh embodiment, a plurality of the MR elements are provided, and a desired one MR element is selected from the plurality of MR elements so that an input signal from the selected MR element is outputted differentially.

Figure 8:
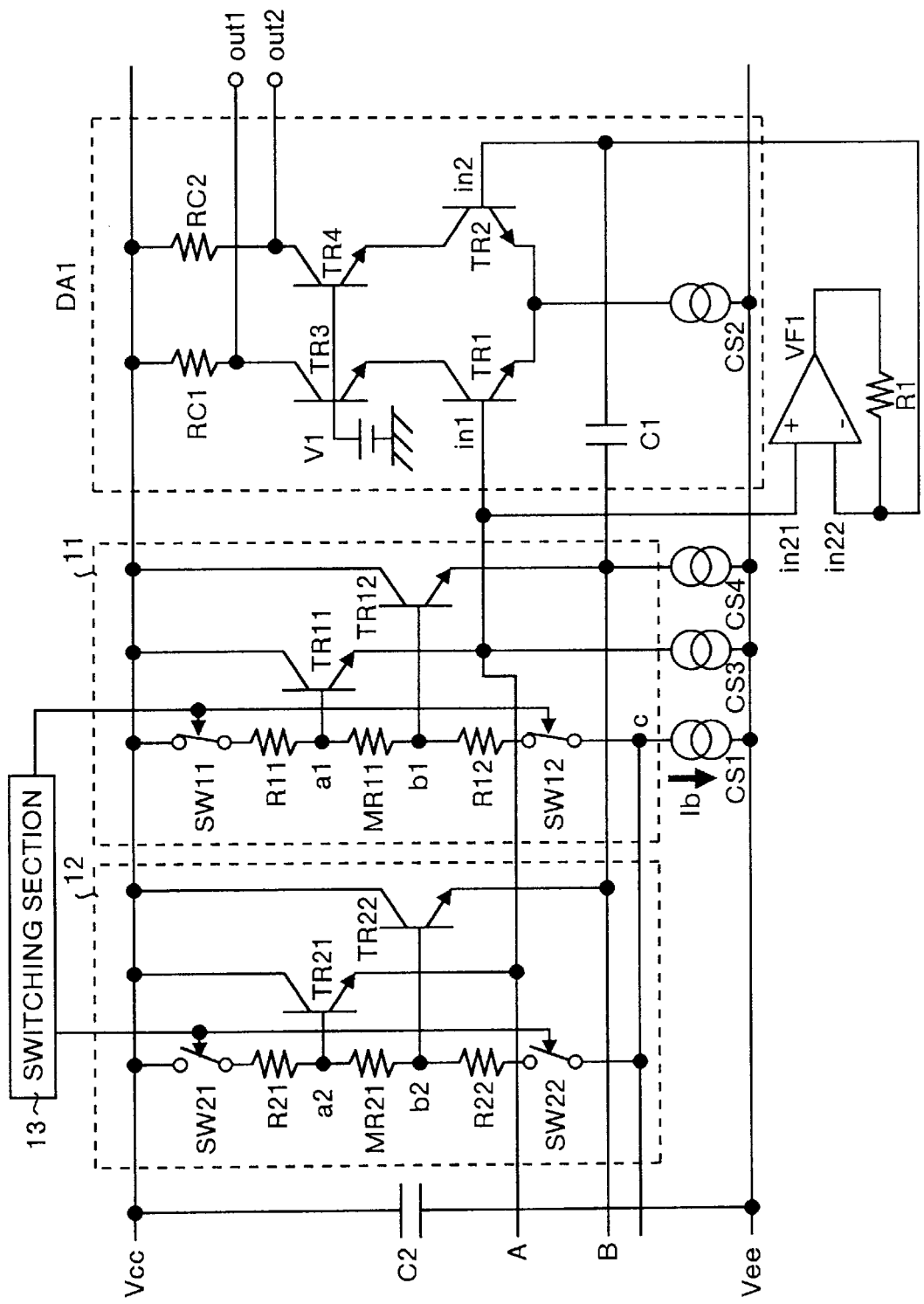
FIG. 8 is a circuit diagram showing a configuration of the signal amplifying circuit for a magnetoresistive element according to a seventh embodiment of the present invention.
Figure 9:
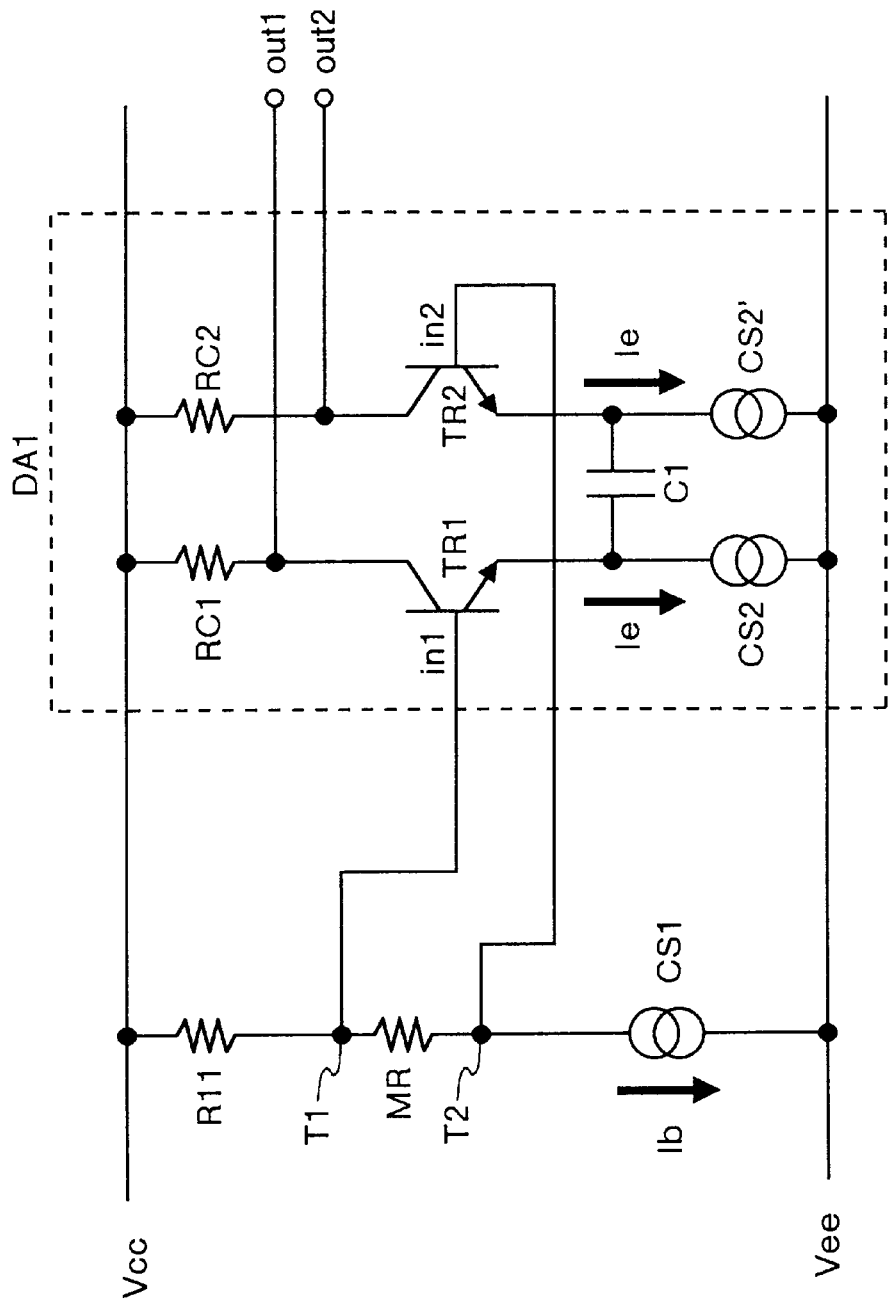
FIG. 9 is a circuit diagram showing a configuration of a signal amplifying circuit for a magnetoresistive element according to a conventional example.
Figure 10:
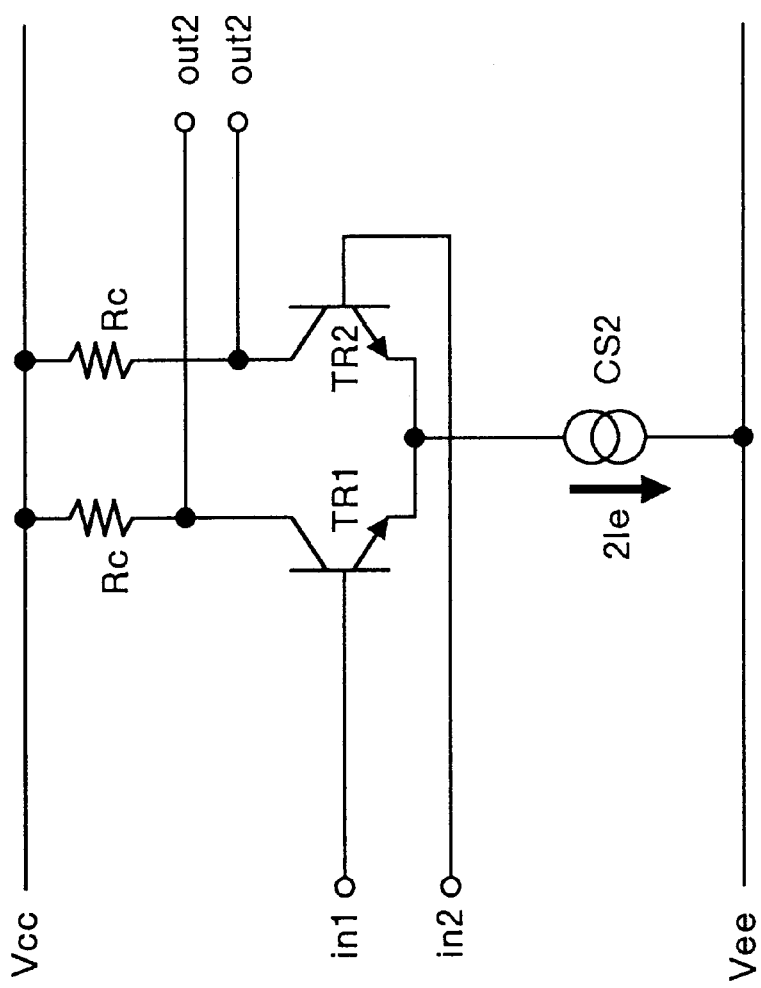
FIG. 10 is a circuit diagram for explaining a cut-off frequency of a differential amplifying circuit.

FIG. 8 is a circuit diagram showing a configuration of the signal amplifying circuit for a magnetoresistive element according to the seventh embodiment of the present invention. The signal amplifying circuit shown in FIG. 8 is arranged so that circuits 11 and 12 corresponding to a circuit 10 including the MR element MR shown in FIG. 6 are connected in parallel. Switches SW11 and SW12 and switches SW21 and SW22, for selecting operations of the MR elements MR1 and MR2 in the circuits 11 and 12, are provided.

Similarly to the circuit 10, in the circuit 11, the resistance R11, the MR element MR1, the resistance R12 and the electric current source CS1 are successively connected in series, and the switch SW11 is connected between the resistance R11 and the power source line Vcc, and the switch SW12 is connected between the node c between the electric current source CS1 and the resistance R12. A base of the transistor TR11 is connected to a node a1 between the resistance R11 and the MR element MR1, and its collector is connected with the power source line Vcc, and its emitter is connected with the input terminal in1 of the differential amplifying circuit DA1. A base of the transistor TR12 is connected with a node b1 between the MR element MR1 and the resistance R12, and its collector is connected with the power source line Vcc, and its emitter is connected with the input terminal in2 of the differential amplifying circuit DA1 via the capacitor C1.

Meanwhile, in the circuit 12, a resistance R21, the MR element MR2 and a resistance R22 are successively connected in series, and the switch SW21 connected between the resistance R21 and the power source line Vcc, and the switch SW22 is connected between the node c and the resistance R22. A base of the transistor TR21 is connected with a node a2 between the resistance R21 and the MR element MR2, and its collector is connected with the power source line Vcc, and its emitter is connected with the input terminal in1 of the differential amplifying circuit DA1. A base of the transistor TR22 is connected with a node b2 between the MR element MR2 and the resistance R22, and its collector is connected with the power source line Vcc, and its emitter is connected with the input terminal in2 of the differential amplifying circuit DA1 via the capacitor C1.

Here, common signal lines A and B are provided taking an actual wiring on a semiconductor chip into consideration. The common signal line A commonly connects the emitter terminal of the transistor TR21, the emitter terminal of the transistor TR11, the non-inversion input terminal in21 of the voltage follower VF1, the electric current source CS3 and the input terminal in1. Meanwhile, the common signal line B commonly connects the emitter terminal of the transistor TR22, the emitter terminal of the transistor TR12, the electric current source CS4 and the capacitor C1. Here, a terminal of the capacitor C2 on the power source line Vee side is commonly connected with a connection line c.

The switches SW11, SW12, SW21 and SW22 are controlled so as to perform open/close operation by a switching section 13. In the case where the MR element MR1 in the circuit 11 is used and an input signal detected by the MR element MR1 is outputted differentially by the differential amplifying circuit DA1, the switching section 13 closes the switches SW1 and SW12 and opens the switches SW21 and SW22 so that the electric current Ib flows only in the MR element MR1. Meanwhile, in the case where the MR element MR2 in the circuit 12 is used and an input signal detected by the MR element MR2 is outputted differentially by the differential amplifying circuit DA1, the switching section 13 closes the switches SW21 and SW22 and opens the switches SW11 and SW12 so that the electric current Ib flows only in the MR element MR2. One of the MR element MR1 and the MR element MR2 is selected by the open/close control, and the differential amplifying circuit DA1 takes out a differential output of the input signal from the selected MR element MR1 or MR2.

According to the seventh embodiment, the plurality of MR elements can be used by selecting them, and even if a deterioration or the like occurs in an MR element, a number of steps of exchanging parts can be reduced by switching the MR element suitably to another MR element. As a result, synthetic durability can be improved.

Here, the first to seventh embodiments can be combined suitably. For example, the structure in the first embodiment may be used in the structure in the seventh embodiment where one of the plurality of MR elements is selected. Moreover, the OTA in the second embodiment can be applied to all the third to seventh embodiments.

As described above, according to the present invention, a first input terminal of a differential amplifying circuit is directly connected with a first terminal of a magnetoresistive element by a connection line, and a second input terminal of the differential amplifying circuit is connected with a second terminal of the magnetoresistive element by a first capacitor. An AC component corresponding to a change in the resistance, which is generated at both the terminals of the magnetoresistive element by the first capacitor, is outputted differentially by the differential amplifying circuit. Further, a DC offset, which is generated between the first input terminal and the second input terminal of the differential amplifying circuit, is canceled by a DC offset cancel circuit, and a cut-off frequency of a high-pass filter, which is formed by the first capacitor and the impedance of the DC offset cancel circuit, is determined. Therefore, a capacitor having a small capacitance can be used as the first capacitor, and hence the signal amplifying circuit can be mounted onto a semiconductor chip IC without providing it as an external component. As a result, the whole signal amplifying circuit can be realized as a circuit on one semiconductor chip IC, and miniaturization and light weight of the signal amplifying circuit are promoted.

According to the present invention, the DC offset cancel circuit is composed by a voltage follower. The first input terminal and the second input terminal of the differential amplifying circuit are connected with a first input terminal and a second input terminal of the voltage follower, and an output is obtained at the second input terminal of the differential amplifying circuit via a first resistance. The DC offset generated between the first input terminal and the second input terminal of the differential amplifying circuit is canceled by the voltage follower, and DC input impedance to the second input terminal of the differential amplifying circuit is set to a desired value by using the first resistance. A cut-off frequency of a high-pass filter, formed by the first capacitor and synthetic impedance of the output impedance of the voltage follower and the first resistance, is determined. As a result, capacitance of the first capacitor can be small, and the signal amplifying circuit can be mounted onto one semiconductor chip IC without externally mounted the first capacitor onto a semiconductor chip. As a result, the whole signal amplifying circuit can be realized as a circuit on the one semiconductor chip IC, and miniaturization and light weight of the signal amplifying circuit can be promoted.

According to the present invention, when the input signals from the first terminal and second terminal of the magnetoresistive element are inputted into the first input terminal and the second input terminal of the differential amplifying circuit, the input signals are inputted via a first emitter follower and a second emitter follower so that an output impedance from the magnetoresistive element is lowered, and thus an unbalanced state of input capacitance to the differential amplifying circuit due to parasitic capacitance of the first capacitor is prevented. Moreover, the high-pass filter is prevented from being formed by the magnetoresistive element and the first capacitor. As a result, an AC voltage difference generated between both the terminals of the magnetoresistive element can be detected securely and accurately.

According to the present embodiment, a second resistance and a third resistance having same resistance value are connected with both the terminals of the magnetoresistive element. A second capacitor shorts the second resistance in an alternating way, the magnetoresistive element and the third resistance which are connected in series, and the input impedance of the differential amplifying circuit is paired so as to be equal. As a result, CMRR can be improved.

According to the present invention, third and fourth transistors are provided on a stage previous to a differential pair of the differential amplifying circuit, and bases of the third and fourth transistors are cascade connected with each other with constant potential. Emitters of the third and fourth transistors are connected respectively with collectors of the differential pair, and outputs from collector terminals of the third and fourth transistors are outputted as differential output of the differential amplifying circuit so that input capacitance of the differential amplifying circuit becomes small. As a result, a high-frequency characteristic of the differential amplifying circuit can be improved.

According to the present invention, a bias electric current which flows in the magnetoresistive element is limited so that an electric potential of the magnetoresistive element such as a mid-point potential is always maintained in a reference potential. For this reason, a comparison circuit controls feedback to a current limiting circuit. As a result, the magnetoresistive element can be protected absolutely.

According to the present invention, a plurality of the magnetoresistive elements are provided, and a plurality of circuits, where input signals generated at both the terminals of the magnetoresistive elements are inputted into one differential amplifying circuit, are provided in parallel. Open/close operation of switches directly connected with the magnetoresistive elements is controlled so that current flow of the magnetoresistive elements is switched so that only input signal from a desired one magnetoresistive element is amplified differentially. For this reason, reading from the desired magnetoresistive element becomes possible by switching the switching elements, and thus the plurality of magnetoresistive elements can be used by selecting them. As a result, even if a magnetoresistive element is deteriorated, a number of time of replacing parts is reduced by switching the magnetoresistive elements suitably into another one, and synthetic durability of the whole signal amplifying circuit can be improved.

According to the present invention, since OTA, where an oscillation margin can be obtained and a noise characteristic is satisfactory, is used as the voltage follower which is the DC offset cancel circuit, the signal amplifying circuit, where an oscillation margin and noise characteristic are further improved, can be realized.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A signal amplifying circuit for a magnetoresistive element having first and second terminals, the circuit comprising:
    a differential amplifying circuit for amplifying and outputting a difference between input signals received at first and second input terminals from a first terminal and a second terminal of a magnetoresistive element to which a bias current is supplied;
    a connection line for directly connecting the first input terminal of said differential amplifying circuit with the first terminal of the magnetoresistive element;
    a first capacitor for connecting the second input terminal of said differential amplifying circuit with the second terminal of the magnetoresistive element; and
    a DC offset cancel circuit for canceling a DC offset between the first input terminal and the second input terminal of said differential amplifying circuit.

2. The signal amplifying circuit for a magnetoresistive element according to claim 1, including a resistor wherein said DC offset cancel circuit is a voltage follower, and the first input terminal and the second input terminal of said differential amplifying circuit are connected respectively to a first input terminal and a second input terminal of said voltage follower and an output of said voltage follower is connected to the second input terminal of said differential amplifying circuit via the resistor.

3. The signal amplifying circuit for a magnetoresistive element according to claim 2, further comprising:
    a first emitter follower having an emitter connected with a node between the first input terminal of said differential amplifying circuit and the first input terminal of said voltage follower and a base connected with the first terminal of the magnetoresistive element; and
    a second emitter follower having an emitter connected with the second input terminal of said differential amplifying circuit via said first capacitor and a base connected with the second terminal of the magnetoresistive element.

4. The signal amplifying circuit for a magnetoresistive element according to claim 1, further comprising:
    a first resistor connected to the first terminal of and in series with the magnetoresistive element;
    a second resistor having the same resistance as said first resistor and connected to the second terminal of and in series with the magnetoresistive element; and
    a second capacitor connected in parallel with said first resistor, the magnetoresistive element, and said second resistor, which are connected in series.

5. The signal amplifying circuit for a magnetoresistive element according to claim 1, wherein:
    said differential amplifying circuit includes first and second transistors connected as a differential pair and third and fourth transistors in a stage before said differential pair and having bases connected in cascade with each other at a constant potential;
    collectors of said first and second transistors are connected respectively to emitters of said third and fourth transistors; and
    outputs from collectors of said third and fourth transistors are, respectively, first and second differential output terminals of said differential amplifying circuit.

6. The signal amplifying circuit for a magnetoresistive element according to claim 1, further comprising:
    a resistance circuit including a first resistor and a second resistor connected in series with each other, the resistance circuit being connected in parallel with the magnetoresistive element;
    a current limiting circuit connected with an upper-stream side of the magnetoresistive element; and a comparison circuit for comparing an electrical potential of a node between the first and second resistors with a reference electrical potential and feeding back to said current limiting circuit so that the electrical potential of the node is adjusted to the reference electrical potential, and limiting a bias current flowing in the magnetoresistive element.

7. The signal amplifying circuit for a magnetoresistive element according to claim 1, including:

a plurality of magnetoresistive elements;

a plurality of switches connected in series with said magnetoresistive elements for controlling current flow in said magnetoresistive elements; and a switching unit for controlling operation of said plurality of switches so a current flows in any one of said plurality of magnetoresistive elements.

8. The signal amplifying circuit for a magnetoresistive element according to claim 1, wherein said DC offset cancel circuit is an operational transconductance amplifier.

* * * * *